United States Patent [19]
Ozawa et al.

[11] Patent Number: 5,797,775
[45] Date of Patent: Aug. 25, 1998

[54] ENGINE CONTROL SYSTEM FOR A WATERCRAFT

[75] Inventors: Shigeyuki Ozawa; Ryoichi Nakase; Keiichi Hiki; Hiroaki Fujimoto, all of Shizuoka-ken, Japan

[73] Assignee: Yamaha Hatsudoki Kabushiki Kaisha, Iwata, Japan

[21] Appl. No.: 674,153

[22] Filed: Jul. 1, 1996

[30] Foreign Application Priority Data

Jun. 30, 1995 [JP] Japan ................. 7-165762

[51] Int. Cl.$^6$ ................. B63H 21/22
[52] U.S. Cl. ................. 440/1; 440/89
[58] Field of Search ................. 440/1, 2, 88, 89; 60/277; 123/90, 130, 198 D, 676

[56] References Cited

U.S. PATENT DOCUMENTS

| | | |
|---|---|---|
| 4,019,489 | 4/1977 | Cartmill ................. 440/1 |
| 4,708,669 | 11/1987 | Kanno et al. ................. 440/1 |

*Primary Examiner*—Jesus D. Sotelo
*Attorney, Agent, or Firm*—Knobbe, Martens, Olson & Bear LLP

[57] ABSTRACT

A watercraft engine control system for controlling the temperature in the exhaust system to protect against potentially dangerous situations. If the exhaust temperature is sensed to be unduly high, a protective action is initiated. This protective action reduced in the flow of unburned fuel to the exhaust system either stopping of the engine or reducing its speed below idle. The protection action may be initiated either immediately or if the situation occurs for more than a predetermined time period.

30 Claims, 8 Drawing Sheets

ENGINE CONTROL SYSTEM FOR A WATERCRAFT

BACKGROUND OF THE INVENTION

This invention relates to an engine control system for a watercraft and more particularly to an improved engine control for preventing over temperature conditions to exist in a watercraft.

As is well known, there are certain problems which are particularly unique to the treatment of exhaust gases in marine propulsion systems. That is, in conventional land vehicles propelled by internal combustion engines, it is possible to position the exhaust system or major portions of the exhaust system for the engine in an area where they will be exposed to the air flow path as the vehicle travels. Thus, land vehicle engine exhaust systems can, for the most part, operate satisfactorily with the cooling by the surrounding air flow. In addition, most vehicle applications permit sufficient length for tuning and silencing of the exhaust gases.

With marine propulsion systems and, particularly inboard propulsion systems, this luxury is not available. Generally, the exhaust system is confined within the hull of the watercraft and, thus, is not conveniently accessible for air cooling. Furthermore, because of spatial constraints, the exhaust system generally is limited in its internal silencing capabilities.

In addition to these problem particularly associated with watercraft, there is a growing interest in utilizing catalytic exhaust systems for marine propulsion systems. Because the exhaust gases are frequently discharged in marine propulsion systems below the body of water in which the watercraft is operating, certain exhaust gas constituents can provide some environmental difficulties. That is, when the exhaust gases are discharged below the body of water and then back to the atmosphere, not only the questions of potential air pollution, but also potential water pollution are important. Thus, catalytic exhaust systems are one alternative way of controlling these environmental conditions.

However, catalytic exhaust systems also require the operation of the catalyst at an elevated temperature. Thus, the cooling problems attendant with conventional non-catalytic exhaust systems are further exacerbated when catalysts are utilized in marine propulsion systems.

There is a further difficulty in connection with the use of catalysts in marine propulsion exhaust systems. One way in which the exhaust gases are cooled and heat transfer reduced in watercraft is by introducing the cooling water from the engine cooling jacket into the exhaust system. By dumping at least some of the engine coolant into the exhaust system, the exhaust gases can be cooled.

However, where catalytic exhaust systems are employed, the addition of water to the exhaust gases is not as feasible. Generally, the catalyst bed is formed from a ceramic material and, if water contacts it, the catalyst may shatter. Even if this does not occur, the water may contain materials, such as salt, in marine environment, which can foul the catalyst. Therefore, the conventional method of introducing water to the exhaust system of a marine propulsion system for silencing and cooling benefits is not as feasible with catalytic exhaust systems for watercraft.

It is, therefore, a principal object of this invention to provide an improved exhaust system for a watercraft.

It is a further object of this invention to provide an improved catalytic exhaust system for a watercraft.

It is a yet further object of this invention to provide an engine control system for a watercraft wherein overheating of the exhaust system is precluded or protected against.

In some engine applications, it has been proposed to protect the catalytic exhaust system from overheating by reducing the speed of the engine. Generally the speed is reduced in the range of 2,000–3,000 rpm and this is done by misfiring the spark plugs. However, when this is done, then unburned raw fuel passes through the exhaust system. When this unburned fuel comes in contact with the catalyst, it will cause a catalytic reaction to occur which still further increases the heat in the exhaust system. Therefore, it is a still further object of this invention to provide an engine control system for a catalytic exhaust system wherein overheating of the catalyst is ensured without initiating protective action that could, in fact, add further heat to the catalyst.

It is a further object of this invention to provide an improved catalytic exhaust treatment system for a watercraft wherein the flow of unburned fuel to the catalyst is precluded when the exhaust temperature overheats.

SUMMARY OF THE INVENTION

This invention relates to an engine control system for a watercraft having a hull. An internal combustion engine is mounted in the hull and drives a propulsion unit for propelling the watercraft hull through a body of water. The engine is provided with an exhaust system for discharging exhaust products from the combustion chambers of the engine to the atmosphere. A temperature sensor is provided for sensing a temperature in the exhaust system. In the event the sensed temperature is above a predetermined value, a control controls the operation of the engine so as to reduce the exhaust heat generated by it by decreasing the amount of fuel passing into the exhaust system.

DETAILED DESCRIPTION OF THE PREFERRED EMBODIMENTS OF THE INVENTION

Figure 1:
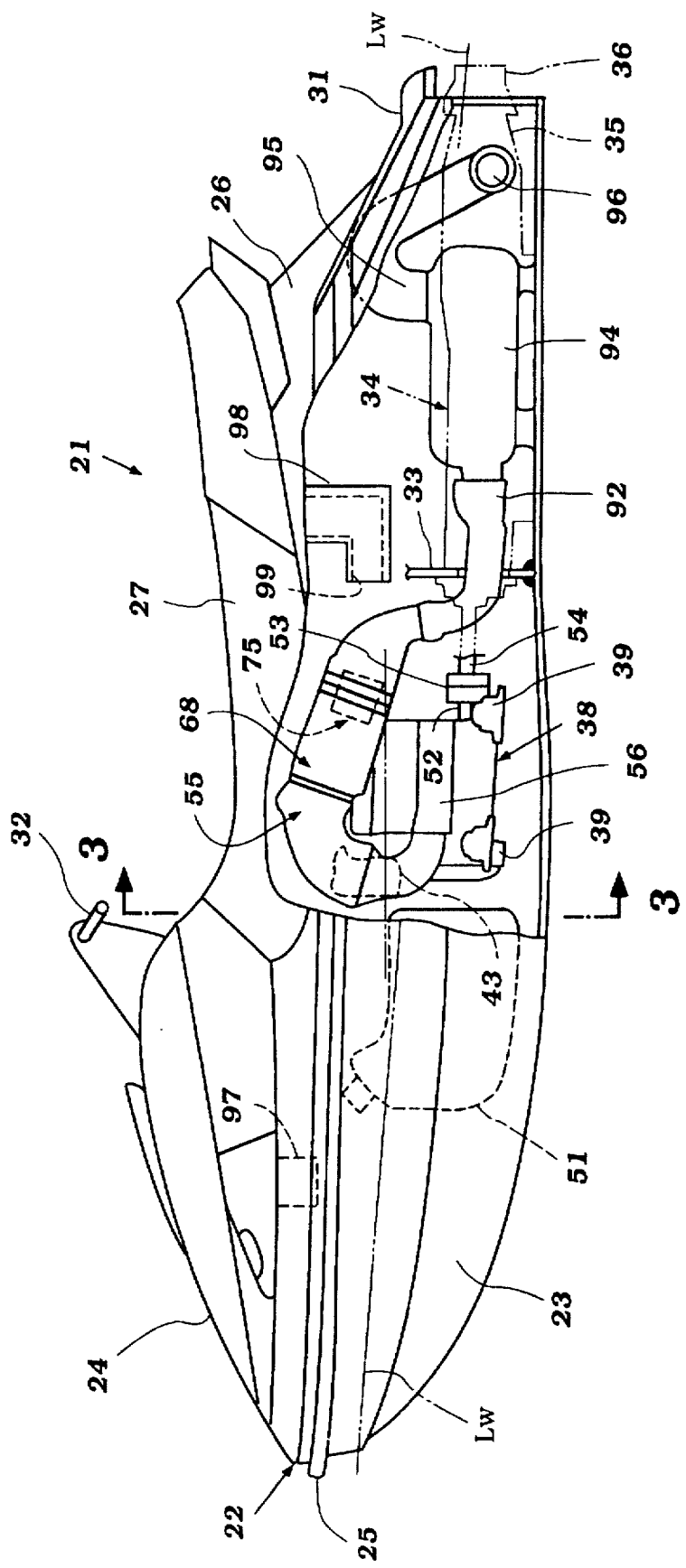
FIG. 1 is a side elevational view, with a portion broken away, of a personal watercraft constructed in accordance with a first embodiment of the invention.

Referring now in detail to the drawings and initially to the embodiment of FIGS. 1–5 and initially primarily to FIGS.

1-3 thereof, a small personal watercraft constructed in accordance with this embodiment is identified generally by the reference numeral 21. The small watercraft 21 is of the type known as a personal-type watercraft and is designed so as to be operated by a single rider and may accommodate one or more passengers. Primarily, the watercraft 21 is configured and particularly its passenger area, as will be described, so that the watercraft can be easily boarded from the body of water in which it is operated. The actual configuration of the watercraft 21 may vary, and the various embodiments show certain examples of configurations which may be employed. Of course, those skilled in the art will readily understand how the invention can be practiced with a wide variety of types of watercraft, and particularly personal watercraft.

The watercraft 21 is comprised of a hull, indicated generally by the reference numeral 22, which is made up primarily of a lower hull portion 23 and an upper deck portion 24. The portions 23 and 24 are formed from a suitable material such as a molded fiberglass reinforced resin or the like and are connected to each other in any manner known in this art. Normally, the connection is provided at an outstanding flange or gunnel 25 which extends around the peripheral edge of the hull 22.

The rearward portion of the hull 22 defines a rider's area. A raised pedestal 26 is provided in this rider's area upon which a seat cushion 27 is supported. As may be seen best in FIG. 3, the area on the sides of the pedestal 26 are provided with foot areas 28 on which riders seated in straddle fashion on the seat 27 may place their feet. In the particular configuration shown in this embodiment, the seat 27 has a length so that it can accommodate the rider/operator and one or two additional passengers.

The outer sides of the foot areas 28 are bounded by raised gunnels 29. Thus, the riders are protected at the sides by these gunnels 29. However, the rear of the foot areas 28 open through the rear of the transom of the watercraft so as to facilitate boarding of the watercraft from the rear. In fact, the raised pedestal 25 is disposed forwardly of the rear end of the hull so as to define a rear deck 31 (FIG. 1) upon which boarding may be made.

The area of the deck 24 forwardly of the seat 27 is provided with a control mast 32 which can be employed for steering of the watercraft in a manner which will be described. In addition, other watercraft controls may be carried by the mast 32; for example, a throttle control.

The portions 23 and 24 of the hull 22 define a compartment. This compartment serves at least in part as an engine compartment and extends at least in part beneath the seat 27 and terminates at its rear end in a bulkhead 33. A jet propulsion unit 34 is mounted within a tunnel that is formed in the underside of the hull portion 23 rearwardly of the bulkhead 33. As is typical, this jet propulsion unit 34 is comprised of a water inlet opening which draws water from an opening formed in the underside of the hull portion 23 or in the jet propulsion unit 34 itself via the action of an impeller. The impeller in turn discharges the water rearwardly past straightening vanes to a discharge nozzle portion 35 upon which a steering nozzle 36 is mounted. The steering nozzle 36 is coupled to the mast 32 for its steering about a vertically extending steering axis so as to control the direction of travel of the watercraft. Since the construction of the jet propulsion unit 34 itself forms no part of the invention, it will not be described further. Reference may be had to any of the numerous known prior art devices for the construction which it may take.

Mounted within the engine compartment forwardly of the bulkhead 33 and primarily beneath the forward portion of the seat 27 is an internal combustion engine, indicated generally by the reference numeral 38. The engine 38 may be of any known type and is illustrated in the various embodiments as being of a two-cylinder in-line type operating on a two-stroke crankcase compression principle. It is to be understood that this type of engine is just typical of those with which the invention may be utilized. Those skilled in the art will understand how the invention can be employed with engines having various cylinder numbers and cylinder orientations. The invention also can be utilized in conjunction with four-cycle engines, but it does have particular utility with two-cycle engines because of the unique emission control problems which they present.

The engine 38 is mounted in the hull portion 23 on engine mounts 39 in a manner that is well known in this art. The engine 38 is provided with an induction system which is indicated generally by the reference numeral 41 and which is disposed at one side of the engine on one side of a longitudinally extending center plane. This induction system includes an air inlet device 42 which has a generally angular configuration and which forms a downwardly opening air inlet portion 43 which is disposed at the front of the engine 38 within the engine compartment.

The air inlet device 42 supplies air to a plenum chamber 44 which extends along the inlet side of the engine 38 and which delivers the air inducted to charge formers in the form of carburetors 45. The carburetors 45 in turn deliver the fuel-air charge which they form to an intake manifold 46 that is mounted to a side of a crankcase chamber formed by a cylinder block 47 of the engine and a crankcase member 48 that is affixed to it.

As is well known in two-cycle engine practice, the crankcase chambers of the engine 38 are sealed from each other and communicate with the combustion chamber of the engine defined by the cylinder bores, pistons, and cylinder heads 49 affixed to the cylinder block 47 through scavenge passages. Since the internal details of the engine 38 may be of any conventional type, a further description of the actual engine construction is not believed to be necessary to permit those skilled in the art to understand and practice the invention.

A fuel tank 51 is positioned in the engine compartment forwardly of the engine so that it lies on the longitudinal center line. This fuel tank 51 supplies fuel to the charge formers or carburetors 45 in any known manner.

The engine 38 includes an output shaft 52, such as a crankshaft, which is journaled within the aforenoted crankcase chamber in any known manner and which extends rearwardly through the end of the engine. A coupling 53 interconnects this engine output shaft 52 with an impeller shaft 54 that extends rearwardly into the jet propulsion unit 34. The impeller shaft 54 is coupled to the aforenoted impeller in a known manner. Again, this particular detail of the construction of the watercraft 21 is not necessary to understand the construction or operation of the invention. Any conventional structure may be employed.

The exhaust products from the engine 48 are discharged to the atmosphere through an exhaust system, indicated generally by the reference numeral 55, and which will be described by primary reference to FIGS. 1 through 6. This exhaust system 55 includes an exhaust manifold 56 that is affixed to the side of the cylinder block 47 and which receives the exhaust gases therefrom through exhaust ports in a well-known manner. This exhaust manifold 56 terminates in a forwardly disposed discharge portion that connects with a C-shaped pipe section, indicated generally by the reference numeral 57.

Figure 3:
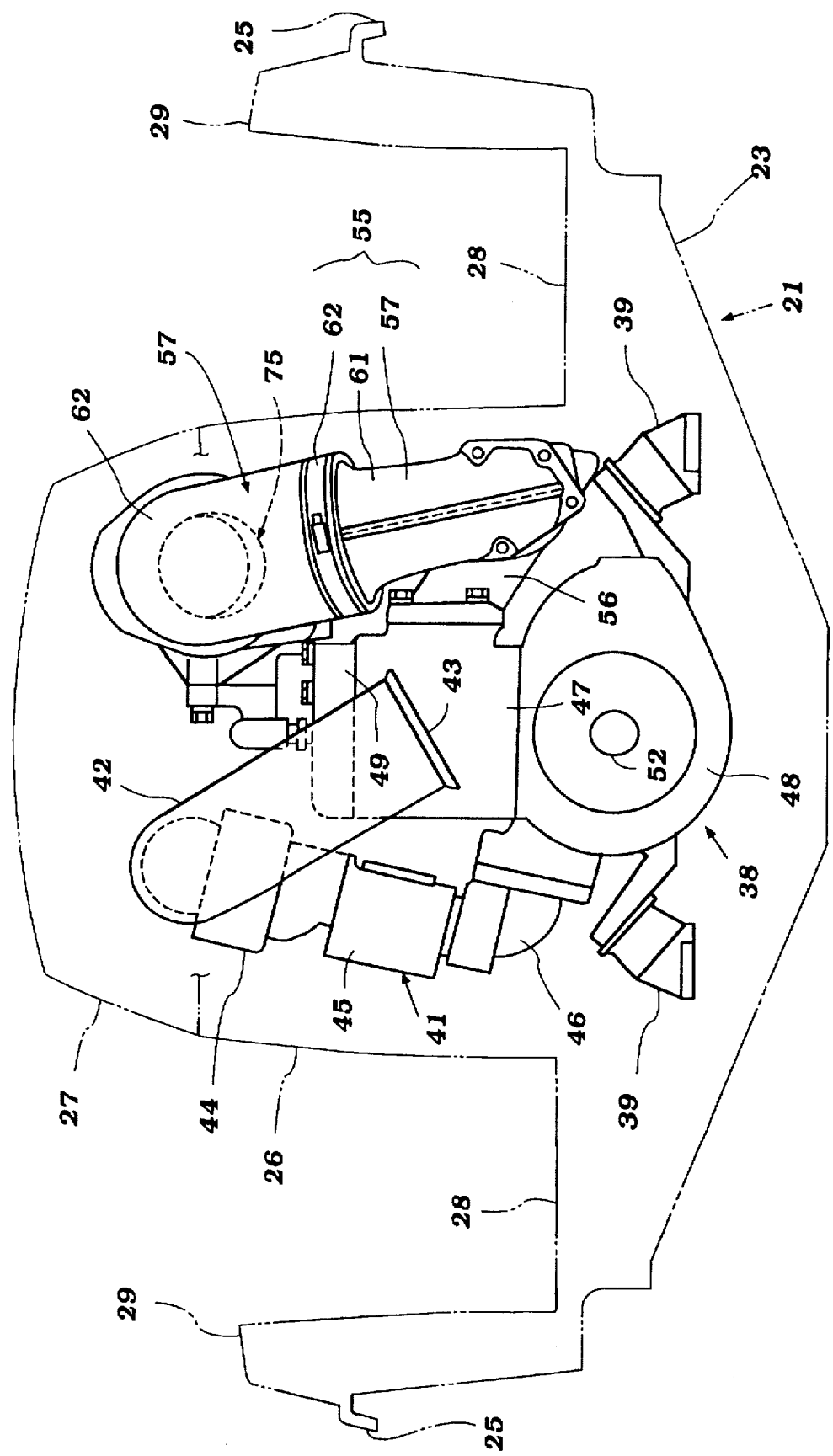
FIG. 3 is an enlarged cross-sectional view taken along the line 3—3 of FIG. 1, but shows the hull in phantom.
Figure 4:
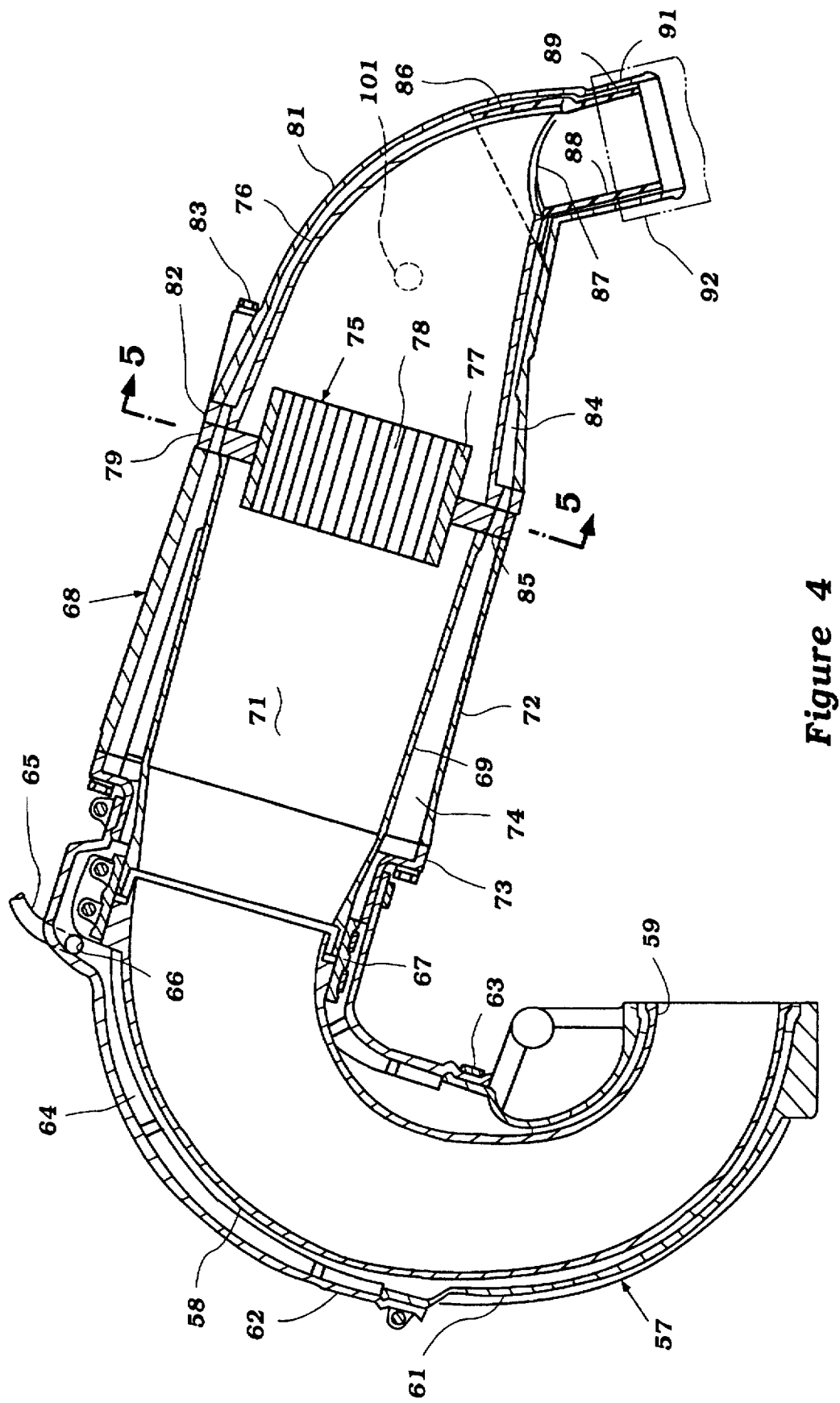
FIG. 4 is an enlarged cross-sectional view taken through the exhaust expansion chamber device.
Figure 5:
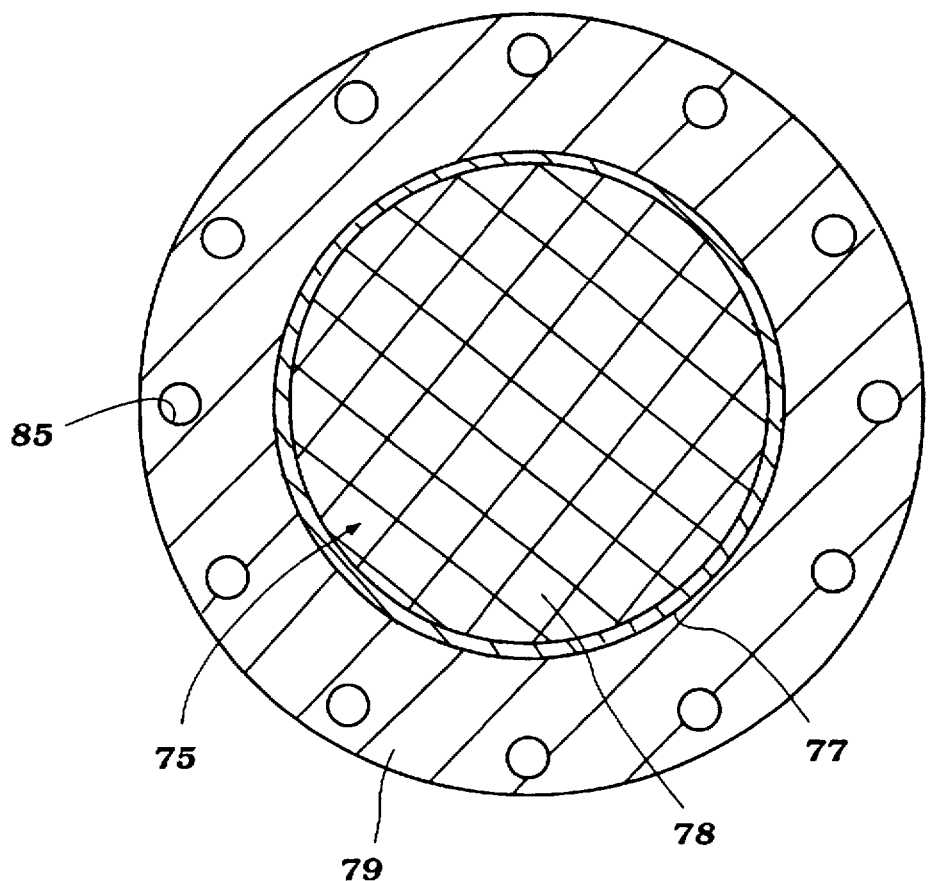
FIG. 5 is a further enlarged cross-sectional view taken along the line 5—5 of FIG. 4 and shows the catalyst bed and its support.

The pipe section 54 has a construction as best shown in FIGS. 3 and 4. This section 57 is comprised of an inner tube 58 that has an opening 59 which communicates directly with the discharge end of the exhaust manifold 56. This inner pipe 58 is surrounded by an outer pipe that is comprised of a lower section 61 and an upper section 62 which are connected to each other through a flexible coupling 63 so as to permit expansion and contraction to accommodate for thermal variations. A water jacket 64 is formed between the inner and outer pipe sections 58, 61, and 62 and is held in water-tight relationship by the coupling 63.

The engine 38 is water cooled, and as is typical in this art, water for cooling purposes is drawn from the body of water in which the watercraft is operating in any known manner. For example, a portion of the water pumped by the jet propulsion unit 34 may be delivered to the engine cooling jacket. This water is then circulated through the engine, and either part of it is discharged to the cooling jacket 64. A hose 65 discharges a portion of this water overboard in a location to provide a tell tale to the operator so that he can be assured that the engine 38 is receiving adequate cooling water.

The outlet end of the C-shaped pipe section 57 is connected by a further elastic coupling 67 to a combined expansion chamber and catalytic converter device, indicated generally by the reference numeral 68. This device 68 is comprised of an inner shell 69 which defines an expansion chamber volume 71. This is connected by the coupling 67 to the inner pipe section 59 so as to receive the exhaust gases therefrom. An outer shell 72 is connected to the inner shell 69 by a header 73 and defines a cooling jacket 74 therearound. Water from the cooling jacket 64 of the C-shaped pipe section 57 is delivered to this cooling jacket 74.

A catalyst bed, indicated generally by the reference numeral 75, is sandwiched in the expansion chamber 71 between the inner shell 69 and a further downstream inner shell 76. The catalyst bed 75 is comprised of an annular shell 77 that, in turn, receives a honeycomb-type catalyst bed 78 of a suitable catalytic material. The bed 78 may, for example, be designed primarily to treat hydrocarbons such as oil in the exhaust and render them harmless. An outer flange 79 supports the shell 77 and is maintained between the outer shell 72 and a further outer shell 81 that surrounds the inner pipe section 76. This inner pipe section 76 has a flange portion 82, with the flange 79 of the catalyst bed being maintained between the shell portions 69, 72, 76, and 81 by threaded fasteners 83.

The shells 76 and 81 define a further water jacket 84 that receives coolant from the cooling jacket 74 through a plurality of passages 85 formed in the catalyst bed flange portion 79.

From this construction it should be readily apparent that the catalyst bed 75 will pass all of the exhaust gases from the engine, and it will be maintained at a desired temperature. However, the cooling jackets 64, 74, and 84 will preclude the transmission of heat from the catalyst bed 75 and the exhaust gases from the remainder of the engine compartments.

It should be noted that the catalyst bed 75, and specifically the actual bed portion 78, is disposed above the water level line $L_w$, which is shown in FIG. 1, under all conditions of the watercraft. The line $L_w$ indicates the water level when traveling at low speed or being stationary. Thus, the catalyst bed 75 will be protected from water contamination by virtue of its height above the water level under all normal conditions of the watercraft 21.

The inner shell 76 is provided with a downwardly turned portion 86 that has a discharge opening 87, which in turn communicates with a flexible pipe section 88 so as to define a continuing water path 89 around this area. The section 88 terminates short of a corresponding part 91 of the outer shell 81 which is received within a flexible conduit 92. Hence, at this point and downstream of the catalyst bed 78 the cooling water from the cooling jackets will be introduced into the exhaust system.

Figure 2:
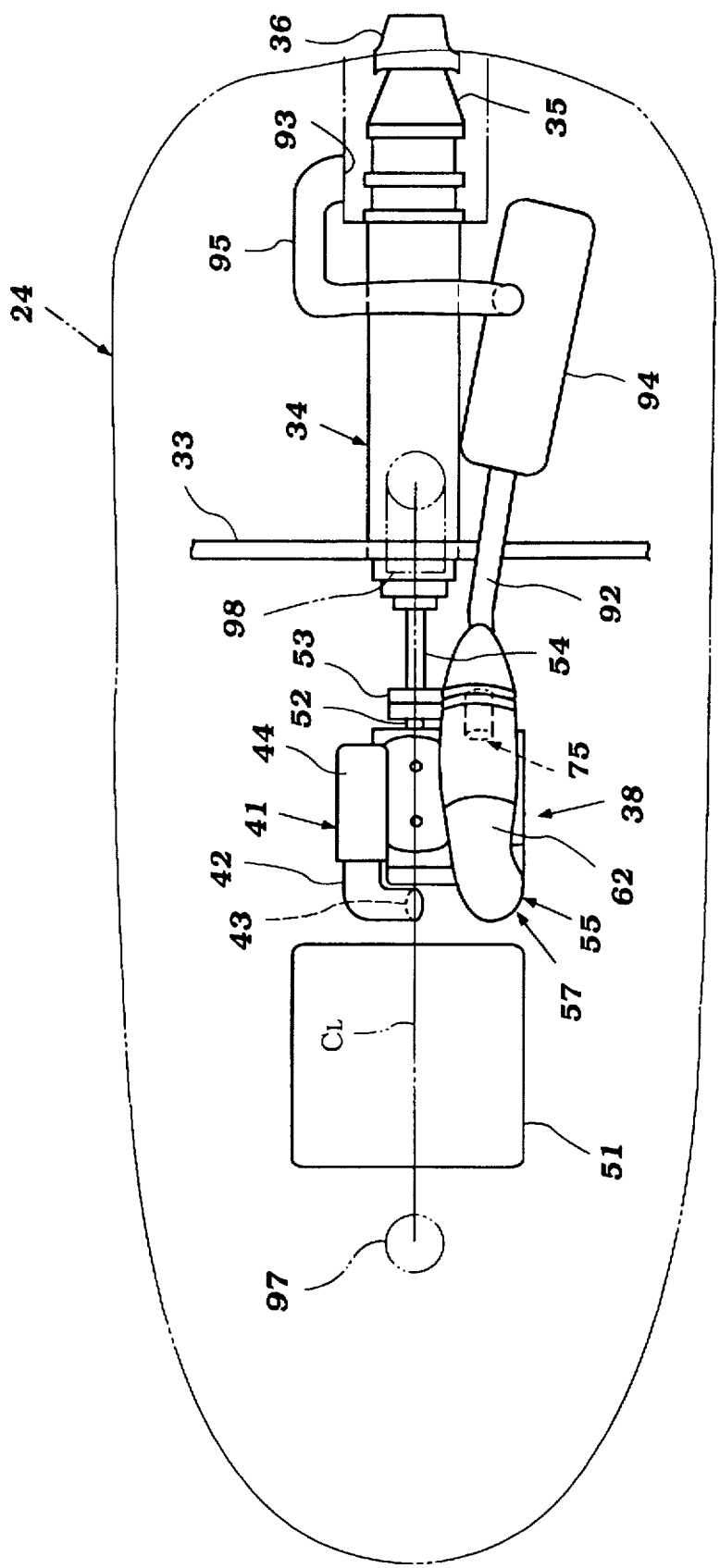
FIG. 2 is a top plan view of the watercraft with the hull shown in phantom, except for the bulkhead that defines the forward end of the tunnel in which the propulsion unit is contained so as to show the orientation of the engine, its auxiliaries, and the propulsion system.

Referring now primarily to FIGS. 1 and 2, the flexible conduit 92 extends rearwardly along one side of the aforenoted tunnel which appears partially in FIG. 2 and which is identified by the reference numeral 93. This conduit 92 is connected to the inlet section of a water trap device 94 that is disposed within the hull on one side of the tunnel 93, and particularly on one side of the jet propulsion unit 34. As is well known in this art, the water trap device 94 is sized so as to provide a sufficient volume to retain water and preclude it from flowing into the engine. In addition, internal baffles may be provided so as to provide water separation functions to offer still further water control.

An exhaust pipe 95 exits from the water trap device 94 and extends upwardly across the top of the tunnel 93 to a discharge end 96 that opens into the tunnel at an area that is close to or actually below the water level $L_w$.

In order to provide atmospheric air for the operation of the engine 38 and also to provide ventilation for the engine compartment and cooling of the exhaust system and catalyst bed 75, there is provided a ventilation system, which is shown in most detail in FIGS. 1 and 2. This ventilating system includes an atmospheric air inlet opening 97 which is provided in a concealed area under the deck 24 and which may be formed at the end of a water trap device that precludes water from being drawn into the engine compartment. The ventilating air inlet 97 is directed generally downwardly at the front of the fuel tank 51 so that air will be introduced into this area and flow rearwardly.

A discharge conduit 98 is provided at the rear portion of the engine compartment and has a forwardly facing opening 99 so that the air will flow through it and then be extracted to an area beneath the seat cushion 27. Hence, there will be a good flow of cooling and ventilating air, and this air flow will actually pass across the outer periphery of the exhaust system and the catalyst bed 75 so as to effectively cool it and offer further protection.

The construction of the watercraft 21 as thus far described and specifically its exhaust system is designed primarily to maintain a relatively low temperature for the components of the exhaust system which are located within the hull 22. However, the presence of the catalytic converter 75, as well as the heat of the exhaust gases, gives rise to a situation wherein certain components of the exhaust system might reach an elevated temperature that could create some problems. Therefore, a thermo-protective system is incorporated which may, in accordance with the invention, includes a thermo control 101 (FIG. 4) which is placed in the expansion chamber shell 81 downstream of the converter 75. As will be described, various types of thermally-operated switches may be employed and several embodiments of protective systems utilizing these thermo switches will now be described by reference FIGS. 6–10.

Basically, these controls operate so as to reduce the temperature of the exhaust system if an over heating condition is sensed. This can be done by reducing the amount of unburned fuel reaching the catalytic converter 75 by reducing the speed at which the engine 38 is operating below idle, and/or by stopping the operation or running of the engine, as will become apparent.

Figure 6:
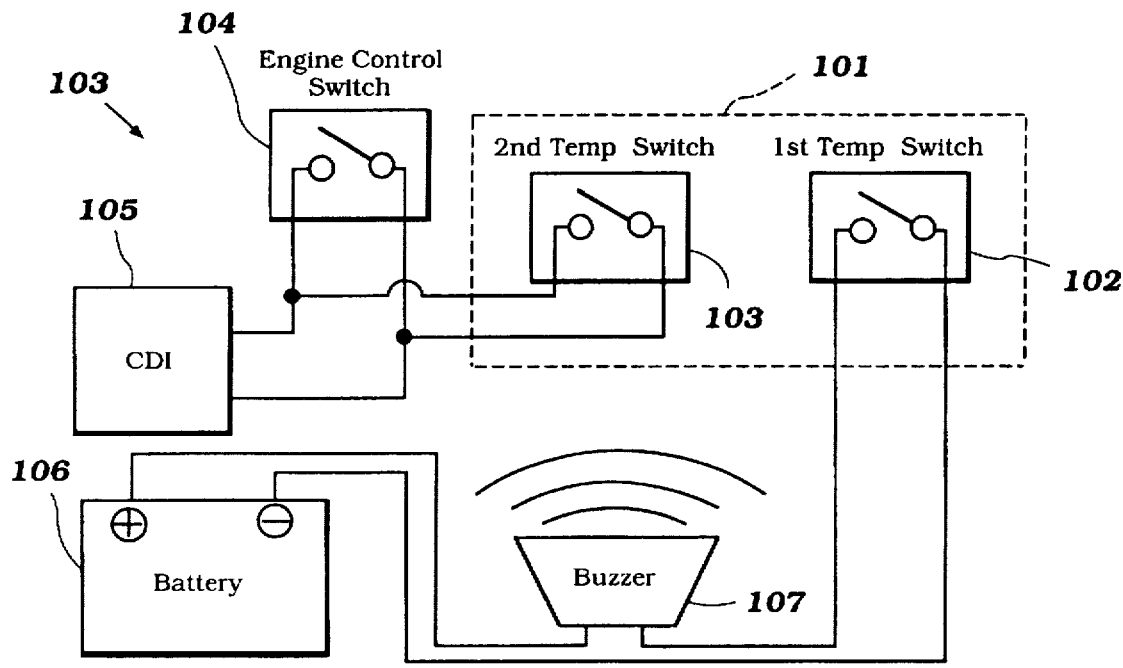
FIG. 6 is a partially schematic diagram showing the control system utilized in accordance with an embodiment of the invention.

Referring first to FIG. 6, this figure is a schematic view showing how the one embodiment of the invention may be constructed. In this feature, the thermo control 101 is actually comprised of first and second switches 102 and 103, respectively, which operate to provide an output when the temperature reaches respective high and higher temperatures. In a specific embodiment, the switch 102 may close when the temperature downstream of the catalytic converter 75 reaches 100° C. while the switch 103 may close when the temperature exceeds 120° C. It should be noted that these temperatures are actually the temperatures of the shell or the exhaust flow and not the actual temperature of the catalyst bed which will be higher.

The control system, indicated generally by the reference numeral 103 includes an engine control switch 104 which controls the capacitor discharge ignition system, shown schematically at 105, so as to reduce the flow of unburned fuel into the exhaust system by either slowing the engine speed to a speed below idling speed or to stopping the engine. The engine speed can be reduced by misfiring one or more of the spark plugs, as is well known in the engine control art.

The system is powered by a battery 106 which also controls a warning buzzer 107 that is positioned in proximity to the rider's area, and particularly the control mast 32. A shutoff switch (not shown) may be associated with the warning buzzer 107 so as to permit the operator to selectively disable it.

Figure 7:
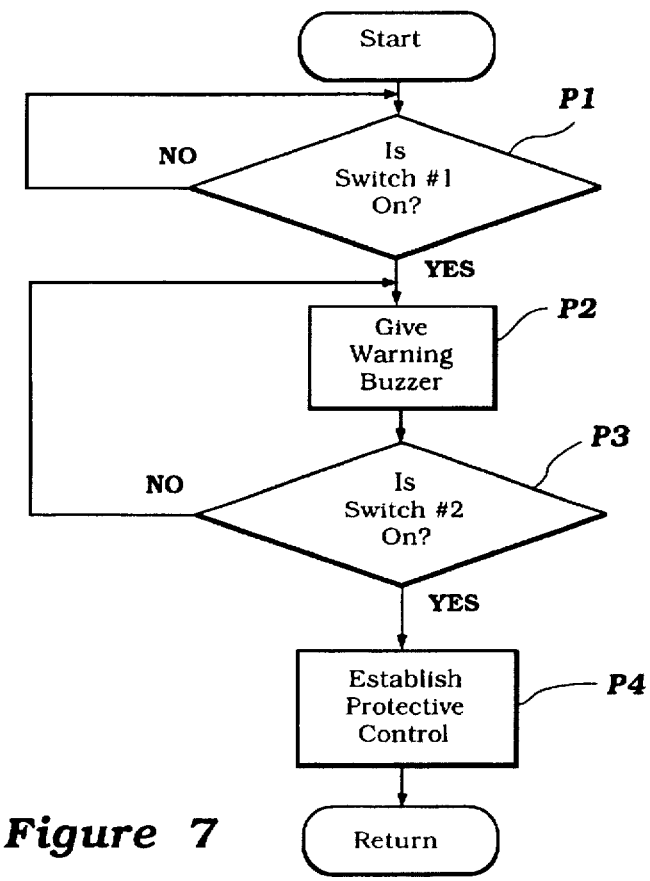
FIG. 7 is a block diagram showing a control routine constructed and operated in accordance with an embodiment of the invention.

The system operates by a control routine as best seen in FIG. 7. The program starts and then moves to the step P1 so as to read the condition of the first lower temperature thermo warning switch 102 and to determine if this switch is on or off. If the switch 102 is not turned off, then the temperature is below 100° C. and the program returns.

If, however, the switch 102 is determined to be closed at the step P1, the program moves to the step P2 so as to alert the operator of a potentially dangerous condition by operating the warning buzzer 107. The operator may then initiate his own protective action or may choose to operate the watercraft uncontrolled for a time period to see if the situation will correct itself.

After the first warning switch 102 has been turned on, the program then monitors the condition of the second warning switch 103. As long as this switch is not turned on and the switch 102 remains on, the program continues to repeat back to the step P2 from the determination at the step P3. If at the step P3 it is determined that the switch 103 is turned on and the temperature has exceeded its turn-on temperature (120° C. in the described embodiment), the program then moves to the step P4 so as to initiate protective action by way of the engine control switch 104. This protective control may, as has been noted, comprise reducing the flow or unburned fuel to the converter 75 by slowing of the speed of the engine 38, for example, below its idle speed or by completely shutting the engine off. If the overheat condition existed when the engine was operating at a low speed, the program may immediately shut the engine down or may first slow the engine down and then turn it off if this control is not effective. The program then returns.

Figure 8:
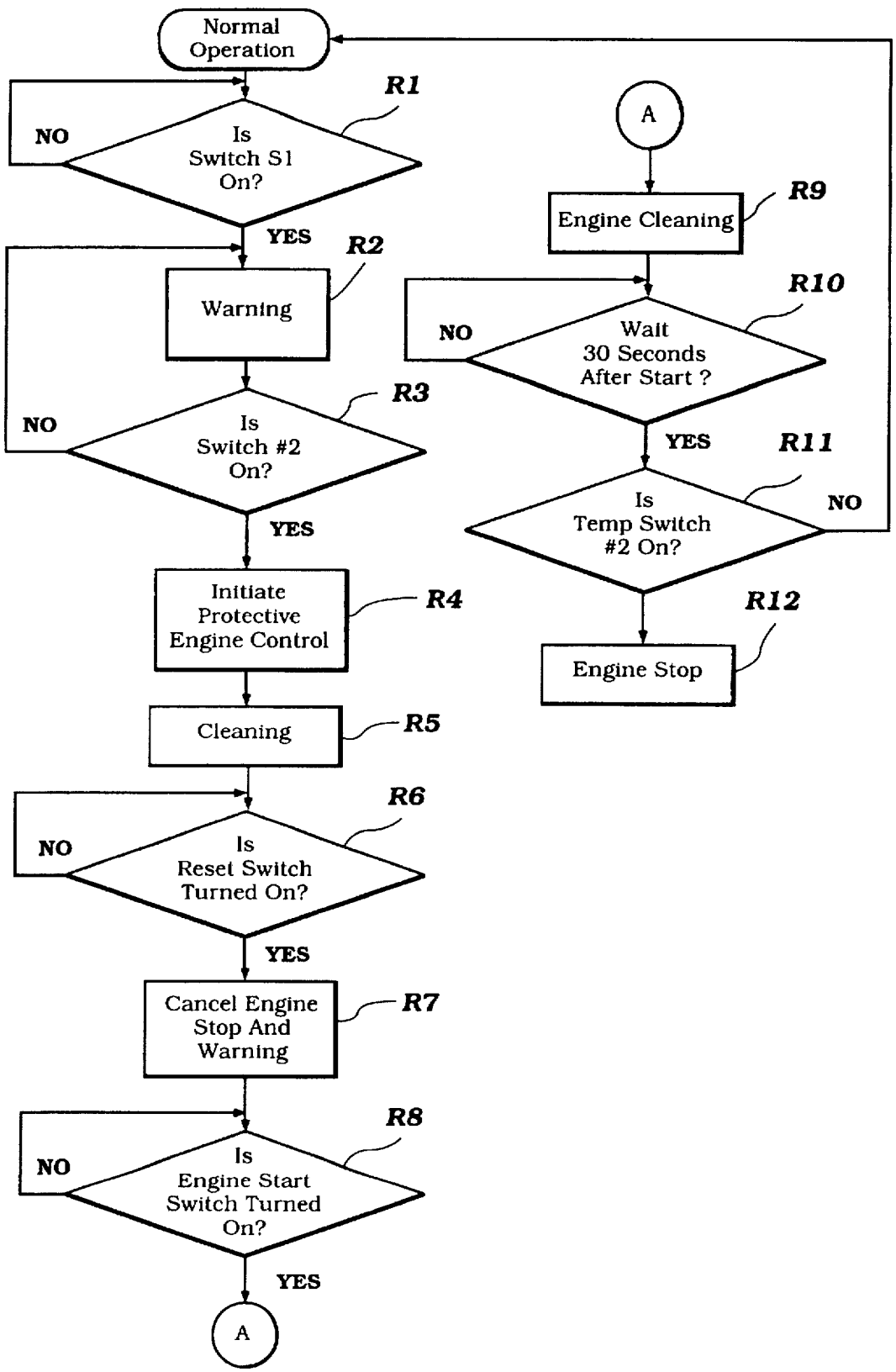
FIG. 8 is a block diagram showing a control routine constructed and operated in accordance with another embodiment of the invention.

In accordance with the control routine described in conjunction with FIG. 7, the operator may wait a time period and then restart the engine in hopes that the exhaust temperature will have reduced to a safe temperature. However, the operator has no real way of determining whether the temperature has been lowered adequately unless the temperature switches do not again actuate in accordance with the control routine shown in FIG. 7. FIG. 8 shows another embodiment of the invention which assists the operator in determining if start up is safe.

This program begins at the step R0 when there is normal engine operation and then moves to the step R1 so as to sense the condition of the first temperature responsive switch 102. If this switch has not been switched on and, thus, the temperature is less than its reset temperature, 100° C. in the described example, the program merely repeats.

If, however, the switch 102 is determined to be on at the step R1, then the program moves to the step R2 so as to initiate the warning buzzer 107.

After the warning has been initiated, the program then moves to the step R3 to determine the condition of switch 103. If the temperature is below 120° C., in the specific example described, the program will repeat back to the step R2. If, however, the condition of the switch 103 indicates that it is on, then the program moves to the step R4 to initiate engine control. In this embodiment, this is preferably by actually stopping the engine.

One of the causes of overheating may be a plugging of the water inlet path to the engine and/or exhaust system. Therefore, after the engine is stopped at the step R4, the operator should initiate a cleaning operation at the step R5 so as to either clean the water inlet and/or water passages for the exhaust system as described.

After the operator has performed his cleaning operation, he is called upon to set a reset switch (not shown). Thus, the program next moves to the step R6 to determine if the reset switch is turned on. If the reset switch is not turned on at the step R6, the program repeats.

If, however, at the step R6 the reset switch has been turned one, then at the step R7 the engine stop condition at the step R4 is switched off and the warning at the step R2 is also canceled. Having completed these operations, then the watercraft is in a condition so that the operator may, if he desires, restart the engine. The program then moves to the step R8 to determine if the operator has restarted the engine by turning on its start switch (not shown).

The program then moves to the step R9 so as to initiate the operation of the engine starter motor and start the engine 38. The program then initiates the operation of a timer which waits a predetermined time, such as approximately 30 seconds at the step R10. If this timer has not run, the program repeats.

If, however, at the step R10 the 30-second interval has passed or whatever time is set by the timer, then the program moves to the step R11 to again sense the condition of the second temperature switch 103. If the temperature switch 103 is not turned on, then the program repeats back to the step R0 to continue normal operation.

If, however, the temperature switch 103 is still on, then the program moves to the step R12 to again stop the engine and, thus, notify the operator that the overheat condition has not been rectified and further protective action is required.

Figure 9:
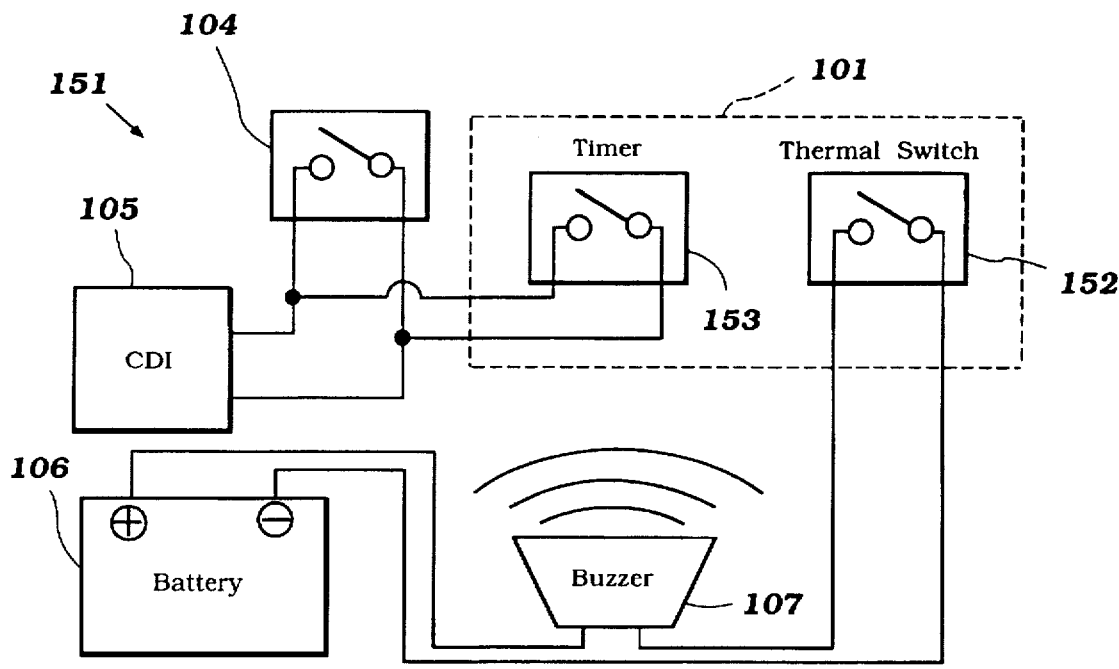
FIG. 9 is a schematic view showing another embodiment of the invention and is in part similar to the embodiment of FIG. 6.
Figure 10:
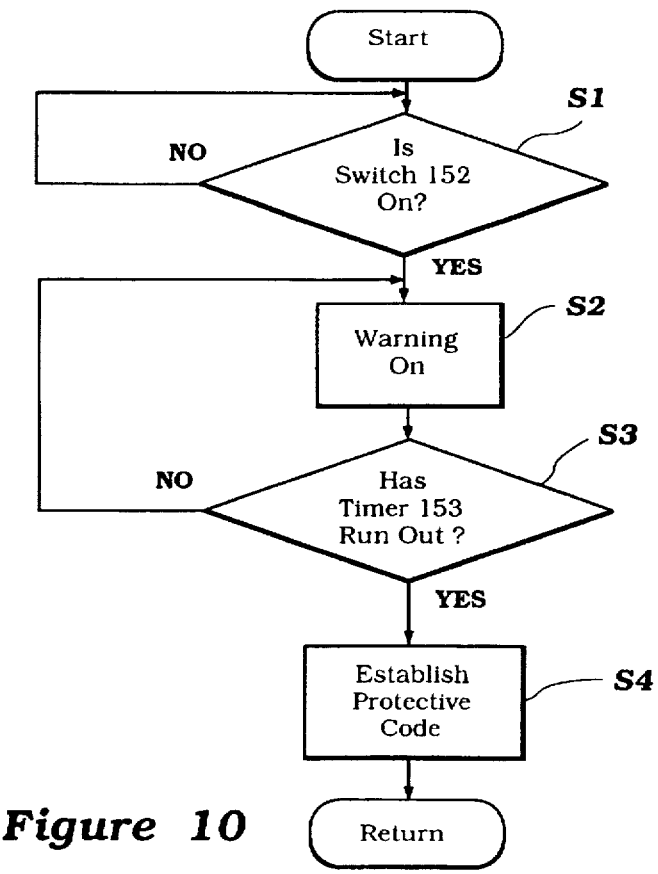
FIG. 10 is a block diagram, in part similar to FIG. 8, and shows a further control routine in accordance with an embodiment of the invention.

FIGS. 9 and 10 show another embodiment of the invention. In the embodiments as thus far described, the temperature sensor 101 has comprised two separate different temperature responsive warning switches. In this embodiment, however, a control circuit, indicated generally by the reference numeral 151 is provided which incorporates many of the elements thus far described. Where that is the case, those elements have been identified by the same reference numerals and will not be described again.

In this embodiment, the temperature warning system 101 is comprised of a thermo switch 152 which may be set to operate a predetermined temperature such as the higher temperature previously described (120° C.) or some intermediate temperature. Once the thermo switch 152 is closed, it begins a timer 153 running and, if the over temperature condition is not cured during this time running, then protective action is initiated.

This control routine will now be described by reference to FIG. 10. In this routine, the program starts and then moves to the step S1 to read the condition of the thermo switch 152. If this reading indicates that the exhaust systems is at a safe temperature, the program merely repeats.

If, however, it is determined at the step S1 that the switch 152 is closed, then the program moves to the step S2 so as to initiate the warning buzzer operation. At the same time, the program starts the timer 153 running.

After the step S2, the program moves to the step S3 to determine if the timer 153 is still running or has run out. If the timer is still running, the program continues to repeat. If, the warning is still on because the switch 152 is still closed at the completion of the time of running of the timer 153, the program moves to the step S4 so as to initiate temperature protection. This will be either a reduction in engine speed below normal idle speed or stopping of the engine, as previously noted. The program then returns.

Thus, from the foregoing description, it should be readily apparent that the described embodiments very effectively protect against overheating in the exhaust system. This may be done by measuring the temperature of the exhaust system shell downstream of the catalyst bed or at other appropriate locations in the exhaust system. Of course, the foregoing description is that of preferred embodiments of the invention, and various changes and modifications may be made without departing from the spirit and scope of the invention, as defined by the appended claims.

What is claimed is:

1. A watercraft comprised of a hull, an internal combustion engine mounted within said hull, a propulsion unit driven by said internal combustion engine for propelling said hull through a body of water, an exhaust system for collecting exhaust gases from said engine and discharging them to the atmosphere, means for sensing a temperature in said exhaust system, and means for initiating a protective action for reducing the temperature of said exhaust system by reducing the amount of fuel passing to the exhaust system when the sensed temperature exceeds a predetermined value.

2. A watercraft as set forth in claim 1, wherein the protective action controls the engine operation.

3. A watercraft as set forth in claim 2, wherein the engine speed is reduced below idle speed.

4. A watercraft as set forth in claim 3, wherein the engine speed is reduced by interrupting the ignition system.

5. A watercraft as set forth in claim 3, wherein the engine is stopped.

6. A watercraft as set forth in claim 5, wherein the engine is precluded from being restarted until a reset switch is enabled.

7. A watercraft as set forth in claim 6, whereupon restarting of the engine after stopping a brief time period elapses before the temperature of the exhaust system is again sensed.

8. A watercraft as set forth in claim 7, wherein the engine speed is reduced.

9. A watercraft as set forth in claim 8, wherein the engine speed is reduced by interrupting the ignition system.

10. A watercraft as set forth in claim 1, wherein the protective action initiates a warning to the operator.

11. A watercraft as set forth in claim 10, wherein the protective action further includes controlling the engine.

12. A watercraft as set forth in claim 11, wherein the engine control is initiated at a higher temperature than the temperature at which the warning is issued.

13. A watercraft as set forth in claim 10, wherein the engine is stopped.

14. A watercraft as set forth in claim 13, wherein the engine is precluded from being restarted until a reset switch is enabled.

15. A watercraft as set forth in claim 14, whereupon restarting of the engine after stopping a brief time period elapses before the temperature of the exhaust system is again sensed.

16. A watercraft as set forth in claim 1, wherein there is provided a catalyst in the exhaust system and the temperature is sensed downstream of the catalyst.

17. A watercraft as set forth in claim 16, wherein the protective action controls the engine operation.

18. A watercraft as set forth in claim 17, wherein the engine speed is reduced.

19. A watercraft as set forth in claim 18, wherein the engine speed is reduced by interrupting the ignition system.

20. A watercraft as set forth in claim 18, wherein the engine is stopped.

21. A watercraft as set forth in claim 20, wherein the engine is precluded from being restarted until a reset switch is enabled.

22. A watercraft as set forth in claim 21, whereupon restarting of the engine after stopping a brief time period elapses before the temperature of the exhaust system is again sensed.

23. A watercraft as set forth in claim 20, wherein the engine is stopped.

24. A watercraft as set forth in claim 16, wherein the protective action initiates a warning to the operator.

25. A watercraft as set forth in claim 24, wherein the protective action further includes controlling the engine.

26. A watercraft as set forth in claim 25, wherein the engine control is initiated at a higher temperature than the temperature at which the warning is issued.

27. A watercraft as set forth in claim 26, wherein the engine speed is reduced.

28. A watercraft as set forth in claim 27, wherein the engine is precluded from being restarted until a reset switch is enabled.

29. A watercraft as set forth in claim 28, whereupon restarting of the engine after stopping a brief time period elapses before the temperature of the exhaust system is again sensed.

30. A watercraft as set forth in claim 16, wherein the engine is water cooled and at least some of the cooling water from the engine is delivered to the exhaust system downstream of the catalyst and downstream of the point where the temperature is sensed.

* * * * *